(12) United States Patent
Meketi

(10) Patent No.: US 8,571,693 B2
(45) Date of Patent: Oct. 29, 2013

(54) METHOD, SYSTEM AND COMPUTER PROGRAM PRODUCT FOR MANAGEMENT OF ROPING CONTESTANT ENTRIES

(76) Inventor: Martin Lee Meketi, Aztec, NM (US)

( * ) Notice: Subject to any disclaimer, the term of this patent is extended or adjusted under 35 U.S.C. 154(b) by 211 days.

(21) Appl. No.: 13/099,373

(22) Filed: May 3, 2011

(65) Prior Publication Data

US 2012/0283854 A1 Nov. 8, 2012

(51) Int. Cl.
G06F 19/00 (2011.01)
(52) U.S. Cl.
USPC ............................... 700/91; 700/92; 434/118
(58) Field of Classification Search
USPC ...................................... 700/90, 91; 434/118
See application file for complete search history.

(56) References Cited

U.S. PATENT DOCUMENTS

2007/0186230 A1* 8/2007 Foroutan ......................... 725/24

* cited by examiner

Primary Examiner — Paul A. D'Agostino
Assistant Examiner — Brandon Gray
(74) Attorney, Agent, or Firm — Steven Rinehart

(57) ABSTRACT

A method is disclosed for collecting fees from, managing, and remunerating contestants in a livestock roping and/or rodeo competition. Contestants in a competition are remunerated after being eliminated in successive runs of the competition in accordance with a predetermined criteria. The remuneration may be monetary and based on total revenue generated, based on the entry price, based on the costs of travel, or in the form of commercial products, such as hardware, music productions, software and the like, as disclosed herein. The object of the present invention is to provide contestants with a way of mitigating the inherent risk of being eliminated from most roping competitions after one, two, or a short amount of runs and having to bear the complete loss of entry fees, travel, board and other incidental expenses. A further object of the present invention is to provide a way of recognizing the membership of contestants from multiple organizations in a single event provided they announce the intention of competing in an event open to all memberships before entering and winning qualifying competitions.

8 Claims, 3 Drawing Sheets

METHOD, SYSTEM AND COMPUTER PROGRAM PRODUCT FOR MANAGEMENT OF ROPING CONTESTANT ENTRIES

BACKGROUND OF THE INVENTION

1. Field of the Invention

This invention relates to methods of managing competitions, and more specifically to a method, system and computer program product for remunerating early-eliminated contestants in a rodeo or roping competition.

2. Description of the Related Art

Contestants across the continental United States pay entry fees to roping and rodeo competitions. These contestants often pay fees of several hundred to several thousand dollars to compete in events sponsored by organizations such as the USTRC® (United States Team Roping Championships), ACTRA (American Cowboy Team Roping Association), World Series of Team Roping, state fairs and rodeos, and other competitions.

These roping competitions are usually sanctioned and managed in accordance with well-established criteria set forth in writing, such as the USTRC® Rule Book. The events are often marketed to contestants of an identified skill level (e.g. beginner, beginner novice, heeler, high level amateur, semi pro, elite, and the like) in published materials subscribed to by roping and rodeo enthusiasts across the country, such as SuperLooper Magazine.

Contestants from across the country regularly pay entry fees months in advance for the opportunity to compete in well marketed events, then expend large amounts of money and time to travel to the events for the chance to compete in the single elimination structure comprising multiple "runs," each of which results in a minority of the contests proceeding to a subsequent run.

Contestants who are eliminated during the first run, or during earlier runs in a tournament competition, often find all efforts and expenditures to compete were for naught, and face no way of recouping costs associated with the competition. For this reason, contestant entries into well-marketing competitions are in a state of permanent depression. Lesser skilled contestants are afraid of competing in events out of fear of early elimination, stifling the enthusiasm of coming generations of competitors, all as are revenues fall that could be generated by event sponsors from the more numerous contestant pools were certain portions of the costs recoupable by contestants. Additionally, contestants are often barred from entering large competitions if they do not pay membership dues to the organization, sanctioning the said competition, such as the USTRC. Contestants from differing third-party organizations are often not permitted to compete in an event sponsored by any one team roping organization.

Contestants from a variety of team roping organizations unconsciously would appreciate the opportunity to announce their intention before competing in roping events to enter a tournament open to winning contestants from any nationally advertised roping event.

The prior art in the industry teaches no way of mitigating the inherent risk of being eliminated from most roping competitions after one, two, or a short amount of runs and no way of avoiding the complete loss of entry fees, travel, board and other incidental expenses in the cases of earlier elimination.

There exists no means in the art of allowing, or managing, contest entry fees in such a way that contestants are remunerated in the case of early elimination, or of recognizing a plurality of membership organizations in a single roping event.

SUMMARY OF THE INVENTION

From the foregoing discussion, it should be apparent that a need exists for a method, system and computer program product for managing roping contestant entries. The present invention has been developed in response to the present state of the art; and, in particular, in response to the problems and needs in the art that have not yet been fully solved by currently available methods, systems and apparatus, and that overcome many or all of the above-discussed shortcomings in the art. Accordingly, the present invention has been developed to provide a method, system and computer program product for managing contest entries in a roping or rodeo competition.

A method is disclosed for managing contestant entries in a roping competition, the steps of the method comprise: creating a virtual account for a contestant by collecting and storing one or more of an contestant's name, ability level, address, credit card number, PayPal® account, telephone number and mobile phone number in persistent computer readable storage on a web-accessible server.

The steps of the method further comprise accepting payment on an entry fee from the contestant for entry into a roping event; permitting the contestant to compete in one or more roping events paid for by the contestant; returning a portion of the entry fee back to the contestant if the contestant is eliminated from the competition in accordance with a predetermined criteria from the group consisting of: the entry fee less ten percent of entry fee total for each run completed by the contestant before elimination; the entry fee less five to twenty percent of entry fee total for each run completed by the contestant before elimination; the entry fee less a dollar amount for each mile traveled by the contestant to reach the competition, not to exceed 100% of the entry fee; the entry fee less a dollar amount for each other contestant referred to the competition by the contestant; the entry fee less a dollar amount for each other contestant referred to the competition by the contestant; the entry fee less a dollar amount for each individual paying to observe the competition; a gift certificated of a predetermined dollar amount to an online retailer for each run completed by the the contestant before being eliminated; and waiving entry fees to future competitions for each run completed by the contestant before being eliminated.

The ability level may comprise an ability level recognized by the USTRC.

The membership information may comprise a membership number in a roping organization, and the name of the roping organization.

In some embodiments, membership information is also collected from the contestant and stored in computer readable memory. In other embodiments, the steps of the method further comprise verifying the contestants membership is with one of a plurality of organizations recognized by an event sponsor; and verifying the contestants membership information with an organization providing the contestant membership.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. The apparatus modules recited in the claims may be configured to impart the recited functionality to the apparatus.

Figure 1:
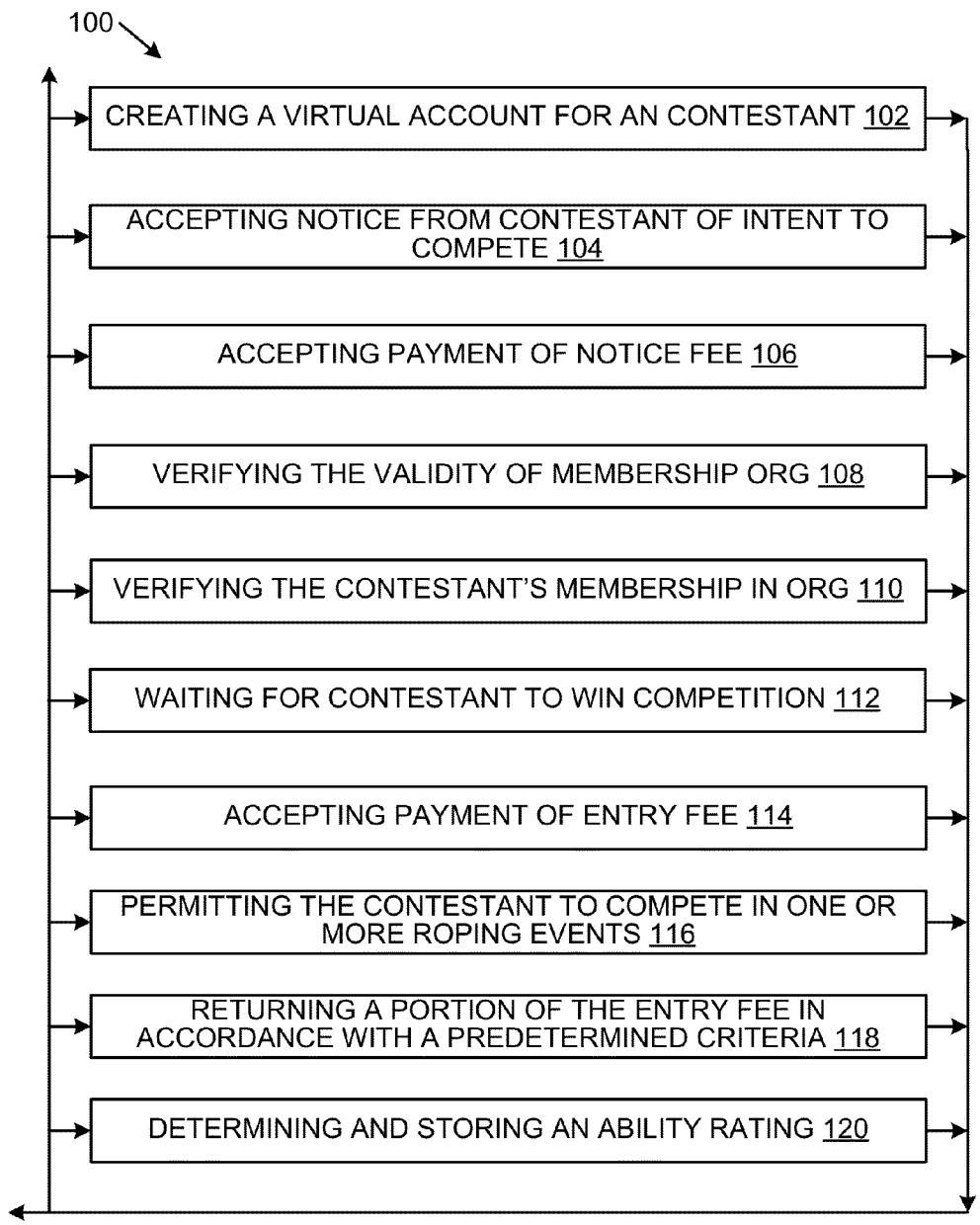
FIG. 1 is a process flow chart of a method of managing roping contestant entries in accordance with the present invention.

FIG. 1 is a process flow chart of a method 100 of managing roping contestant entries in accordance with the present invention.

The method 100 begins when a virtual account is created for a contestant in computer readable memory. The virtual account may be created in memory logically connected to a web server. The virtual account may comprise a record in a database, manageable by a database management system (DBMS) or relational database management system (RDBMS), as known to those of skill in the art.

The web server may comprise a computer program running on one or more data processing devices (DPDs), such as a server, computer workstation, router, mainframe computer, or the like. In various embodiments, the DPD comprises one or more processors. The processor is a computing device well-known to those in the art and may include an application-specific integrated circuit ("ASIC").

The virtual account comprises personal information identifying, and associated with, a contestant, which information is voluntarily submitted to the server by the contestant, such as name, mailing address, email address, phone number, and the like. The personal information may further comprise information related to the contestant's roping skill level; membership in a roping organization, such as USTRC or ACTRA, membership number in the roping organization, and the identity of a sponsoring contestant.

The personal information in the virtual account may be communicated to one or more event authorities via email using variations of the Simple Mail Transfer Protocol (SMTP), Internet Message Access Protocol (IMAP), Post Office Protocol (POP), or other protocols well-known to those of skill in the art.

Next, notice is accepted 104 from the contestant that the contestant intends to compete in a nationally renown competition. This notice must be accepted 104 before the contestant competes in the competition and this notice is submitted in connection with a fee. The notice can be written on hard copy, or made electronically via the web server. In some embodiments, the notice comprises a preprinted form filled out by the contestant.

The nationally renown competition may be any event sponsored or sanctioned by USTRC, ACTRA, World Series of Team Roping, or any other roping organization that is organized before the corporate division of any state government, or any roping organization consisting of 500 members or more who have paid a membership due to become a member of that roping organization.

Additionally, in some embodiments, the nationally renown competition may further comprise any event advertised in a magazine a major circulation in an add that is larger than ⅓ of a page, such as SuperLooper Magazine.

The method 100 progresses by accepting 106 payment of an entry fee from the contestant submitted in connection with the notice. In some embodiments, the web server may collect entry fee and/or notice fee payment(s) from contestants via means well-known to those of skill in the art, including PayPal®, credit card credits, direct bank deposits, and the deposits, and the like.

Next, the validity of the membership organization is verified. In some embodiments, a human being will call the membership organization the contestant claims membership in. The human being will verify that the organization has over 500 members who have paid membership dues using means well-known to those of skill in the art. In other embodiments, the validity of the membership organization is verified by cross-referencing a list in computer readable memory with the membership organization identified in the personal information. If a match is found by the web server doing the cross-referencing, the validity of the organization is confirmed and the method 100 progresses and the contestant's membership in the organization is verified 110.

When the contestant's membership in the organization is verified 110, a human being or the web server verifies with the membership organization that the contestant is a member of that organization. In other embodiments, the verification step 110 is satisfied by documentation, or copies of documentation, remitted to the human being responsible for realizing the verification step 110.

In some embodiments, the remaining steps in the method 100 are dependant upon the contestant winning 112 the nationally renown competition and provided proof of the contestant's win.

In some embodiments, an additional entry fee must be paid 114 by the contestant before the remaining method 100 steps are realized. In other embodiments, the contestant is automatically entered in championship roping event open to contestant by virtue of the contestant's notice and performance in the nationally renown competition.

The contestant is permitted 116 to compete in the championship roping event sponsored by an organization or individual maintaining control of the web server and to whom the contestant knows he/she was interacting when submitting the personal information.

The championship roping event is held in accordance with the rules of one of the valid membership organizations, such as the USTRC. If the contestant is permitted 116 to compete in the championship roping competition, and the contest is eliminated during the first round, a portion of either the notice fee and/or entry fee is returned to the contestant in accordance with one of the following criteria: In some embodiments, the entry fee less ten percent of entry fee total for each run completed by the contestant before elimination is returned. In some embodiments, the entry fee less five to twenty percent of entry fee total for each run completed by the contestant before elimination is returned; and in other embodiments, the entry fee less a dollar amount for each mile traveled by the contestant to reach the competition, not to exceed 100% of the entry fee, is returned to the contestant.

In still further embodiments, the entry fee less a dollar amount for each other contestant referred to the competition by the contestant is returned; while in other embodiments, the entry fee less a dollar amount for each other contestant referred to the competition by the contestant is returned the contestant.

In additional embodiments, the entry fee less a dollar amount for each individual paying to observe the competition is given or returned to the contestant. A gift certificated of a predetermined dollar amount to an online retailer may also be remitted to the contestant for each run completed by the contestant before being eliminated; and waiving entry fees to future competitions for each run completed by the contestant before being eliminated.

Finally, in some embodiments, an ability rating is determined 120 for the contestant based on the contestant's performance in the championship roping event.

Figure 2:
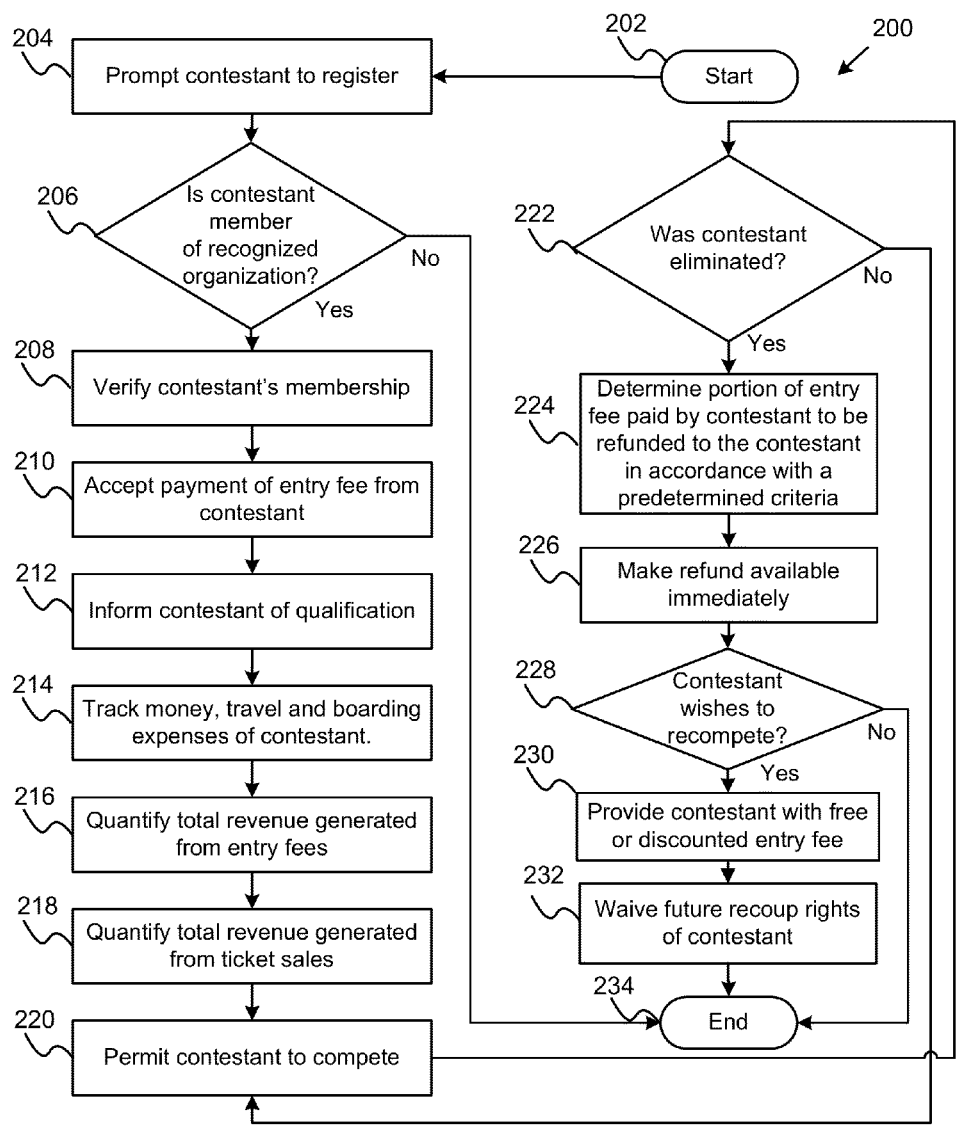
FIG. 2 is a process flow chart of a second embodiment of a method of managing roping contestant entries in accordance with the present invention.

FIG. 2 is a process flow chart of a second embodiment of a method of managing roping contestant entries in accordance with the present invention The method 200 begins by prompting 204 a contestant to register for a roping event.

The method 200 beings by prompting 204 a contestant to preregister for a championship roping event. The contestant may be prompted 204 through US mail, email, in a magazine or periodical of major circulation, to preregister for the championship roping competition.

The contest then registered, and virtual account is created for the contestant comprising personal identifying information of the contestant as substantially described above in relation to FIG. 1.

The method 200 proceeds 206, wherein the contestant's membership is an organization recognized as renown is verified as substantially described above in relation to FIG. 1.

Next, the contestant's membership is verified 208 as substantially described above in relation to FIG. 1. Subsequently, an entry fee and/or notice fee is accepted 210 from the contestant using means well-known to those of skill in the art and summarized above.

After the contestant's membership has been verified 208, and the organization has been verified 206, and the entry fee has been accepted 210, a qualifying contestant is informed 212 of his qualification for an upcoming championship roping tournament provided that the contestants wins a nationally recognized roping event before the championship. In some embodiments of the present invention, the contestant must place in one of the top three, or one of the top five, positions in one of a plurality of events in a nationally recognized roping event to qualify for the championship roping tournament.

Money garnered from the realization of the championship roping tournament is tracked, or quantified, in the present invention. In step 216, the total amount of money generated from entry fees is calculated for the purposed of distributing a portion of it to contestants who are eliminated from the championship tournament during the first round, second round, or any of the earlier rounds in the championship tournament.

The requirements that a contestant demonstrate membership in a recognized organization and pay a notice and/or entry fee are the "contestant requirements."

Next, in step 218, the total amount of money generated from ticket sales to the championship tournament is calculated for the purposed of distributing a portion of it to contestants who are eliminated from the championship tournament during the first round, second round, or any of the earlier rounds in the championship tournament If the contestant competes in the championship tournament and is eliminated during the first round 222, the method 200 progresses and a determination is made 224 of the amount of money that ought to be refunded, or given, to the contestant who competed in tournament. This determination is made is accordance with one of the criteria set forth above in relation to FIG. 1.

The refund, or gift, to the contestant is made available 226 immediately, and a determination is made 228 of whether the contestant wishes to compete again in a subsequent championship tournament in the following year.

In some embodiments of the present invention, the contestant is automatically entered 230 in the next championship tournament in the following year without payment of an entry fee or notice fee that would normally be required. In other embodiments, the contestant is randomly entered into a drawing, the winner of which receives one or more of a refund of an entry free, free qualification for a subsequent tournament, or livestock. If the contestant is automatically entered in a subsequent tournament, that contestant's rights to recoup, or recover, subsequent entry fees may be waived 232.

Figure 3:
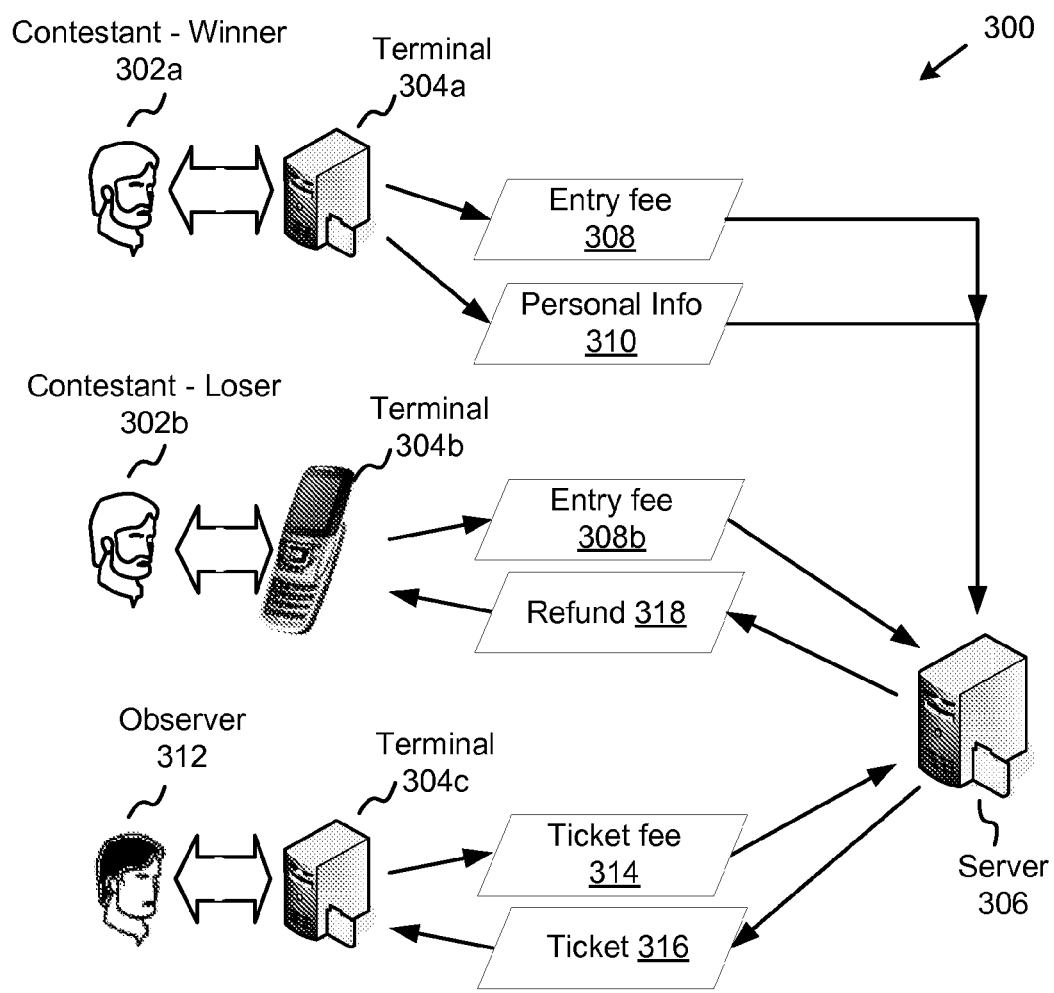
FIG. 3 is a simplified diagrammatic entity-relationship illustration of the flow and aggregation of money and information between entities participating in a system for remunerating contestants in a roping competition in accordance with the present invention.

FIG. 3 is a simplified diagrammatic entity-relationship illustration of the flow and aggregation of money and information between entities participating in a system for remunerating contestants in a roping competition in accordance with the present invention. The system 300 comprises a constant 302a, a contestant 302b, a terminal 304a, a terminal 304b, a terminal 304c, a server 306, an entry fee 308a, an entry fee 308b, personal info 310, an observer 312, a ticket fee 314, and a ticket 316.

FIG. 3 is a simplified diagrammatic illustration of the flow and aggregation of money between entities participating in a system 300 for managing contestant entries in a roping or rodeo event.

The server 306, as noted above, in some embodiments, comprises a computer program in firmware or persistent computer readable storage running on one or more data processing devices (DPDs), such as a server, computer workstation, router, mainframe computer, smart phone, or the like. In various embodiments, the DPD comprises one or more processors. The processor is a computing device well-known to those in the art and may include an application-specific integrated circuit ("ASIC").

The server 306 interfaces with contestants 302a-b and observers 312 vis-à-vis an interactive website on the Internet. The server 306 is configured to automatically process payments for contestants 302a-b and observers 312 using means well-known to those of skill in the art, including PayPal®, credit card credits, gift cards, bank wire, direct bank deposits, and the like. In addition to interfacing via the website, the server 306 may interact electronically with the contestants 302a-b using variations of the Simple Mail Transfer Protocol (SMTP), Internet Message Access Protocol (IMAP), Post Office Protocol (POP), or other protocols well-known to those of skill in the art.

The contestants 302a-b and the observer 312 may comprise any person, company or organization.

Contestant 302a, in the shown embodiment, submits an entry fee 308 and personal information 310 to the server 306. Both the entry fee 308 and the personal information 310 are substantially described above in relation to FIGS. 1-2. Because contestant 302a ultimately wins the championship tournament, no refund 318 is remitted to contestant 302a as it is to contestant 302b, who ultimately receives a refund 318 electronically.

Like contestants 302a-b, observers 312 of the tournament purchase tickets 316 electronically via the Internet, and make payment 314 via the server 306. The tickets 316 may be remitted in electronic form to the observer 312.

The terminals 304a-c may comprise any DPD, including a smart phone.

To promote continued interest in roping tournaments, in some embodiments of the present invention, parents whose children, in quantities of one or more, qualify for the championship tournament may have their entry fees and/or notice fees and/or qualification requirements waived for the championship tournament.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing roping contestant entries, the steps of the method comprising:
    creating a virtual account for a contestant by collecting and storing one or more of an contestant's name, membership information, address, credit card number, PayPal® account, telephone number and mobile phone number in persistent computer readable storage on a web-accessible server;
    verifying the contestants membership is with one of a plurality of organizations recognized by an event sponsor;
    verifying the contestants membership information with an organization providing the contestant membership;
    accepting payment on an entry fee from the contestant for entry into a roping event;
    permitting the contestant to compete in one or more roping events paid for by the contestant;
    returning a portion of the entry fee back to the contestant if the contestant is eliminated from the competition in accordance with a predetermined criteria from the group consisting of:
        the entry fee less ten percent of entry fee total for each run completed by the contestant before elimination;
        the entry fee less five to twenty percent of entry fee total for each run completed by the contestant before elimination;
        the entry fee less a dollar amount for each mile traveled by the contestant to reach the competition, not to exceed 100% of the entry fee;
        the entry fee less a dollar amount for each other contestant referred to the competition by the contestant;
        the entry fee less a dollar amount for each other contestant referred to the competition by the contestant;
        the entry fee less a dollar amount for each individual paying to observe the competition;
        a gift certificated of a predetermined dollar amount to an online retailer for each run completed by the contestant before being eliminated; and
        waiving entry fees to future competitions for each run completed by the contestant before being eliminated.

2. The method of claim 1, wherein the membership information comprises a membership number in a roping organization, and the name of the roping organization.

3. A method for managing roping contestant entries, the steps of the method comprising:
    creating a virtual account for a contestant by collecting and storing one or more of an contestant's name, membership information, address, credit card number, PayPal® account, telephone number and mobile phone number in persistent computer readable storage on a web-accessible server;
    accepting payment on an entry fee from the contestant for entry into a roping event;
    permitting the contestant to compete in one or more roping events paid for by the contestant;
    returning a portion of the entry fee back to the contestant if the contestant is eliminated from the competition in accordance with a predetermined criteria from the group consisting of:
        the entry fee less ten percent of entry fee total for each run completed by the contestant before elimination;
        the entry fee less five to twenty percent of entry fee total for each run completed by the contestant before elimination;
        the entry fee less a dollar amount for each mile traveled by the contestant to reach the competition, not to exceed 100% of the entry fee;
        the entry fee less a dollar amount for each other contestant referred to the competition by the contestant;
        the entry fee less a dollar amount for each other contestant referred to the competition by the contestant;
        the entry fee less a dollar amount for each individual paying to observe the competition;
        a gift certificated of a predetermined dollar amount to an online retailer for each run completed by the contestant before being eliminated; and
        waiving entry fees to future competitions for each run completed by the contestant before being eliminated.

4. The method of claim 3, wherein the membership information comprises a membership number in a roping organization, and the name of the roping organization.

5. A method for managing roping contestant entries, the steps of the method comprising:
creating a virtual account for a contestant by collecting and storing one or more of an contestant's name, membership information, address, credit card number, PayPal® account, telephone number and mobile phone number in persistent computer readable storage on a web-accessible server;
accepting notice from the contestant that the contestant intends to compete in a nationally renown roping event sanctioned by a team roping organization before the roping event has commenced,
accept payment of an entry fee from the contestant in conjunction with the notice before the roping event has commenced;
in response to the contestant winning the roping event, permitting the contestant to compete in one or more championship roping events sponsored by an independent third-party roping organization not affiliated with the team roping organization sanctioning the roping event;
returning a portion of the entry fee back to the contestant if the contestant is eliminated from the competition in accordance with a predetermined criteria from the group consisting of:
the entry fee less ten percent of entry fee total for each run completed by the contestant before elimination;
the entry fee less five to twenty percent of entry fee total for each run completed by the contestant before elimination;
the entry fee less a dollar amount for each mile traveled by the contestant to reach the competition, not to exceed 100% of the entry fee;
the entry fee less a dollar amount for each other contestant referred to the competition by the contestant;
the entry fee less a dollar amount for each other contestant referred to the competition by the contestant;
the entry fee less a dollar amount for each individual paying to observe the competition;
a gift certificated of a predetermined dollar amount to an online retailer for each run completed by the contestant before being eliminated; and
waiving entry fees to future competitions for each run completed by the contestant before being eliminated.

6. The method of claim 5, wherein the team roping organization comprises one of the USTRC® (United States Team Roping Championships), ACTRA (American Cowboy Team Roping Association), and World Series of Team Roping.

7. The method of claim 5, wherein the team roping organization comprises any organization with more than 500 registered members who have paid membership dues.

8. The method of claim 5, wherein the roping event is advertised in a periodical with an ad of at least a half page in size.

* * * * *